R. F. RASMUSSEN.
STOCK WATERER.
APPLICATION FILED DEC. 29, 1915.
1,184,773. Patented May 30, 1916.
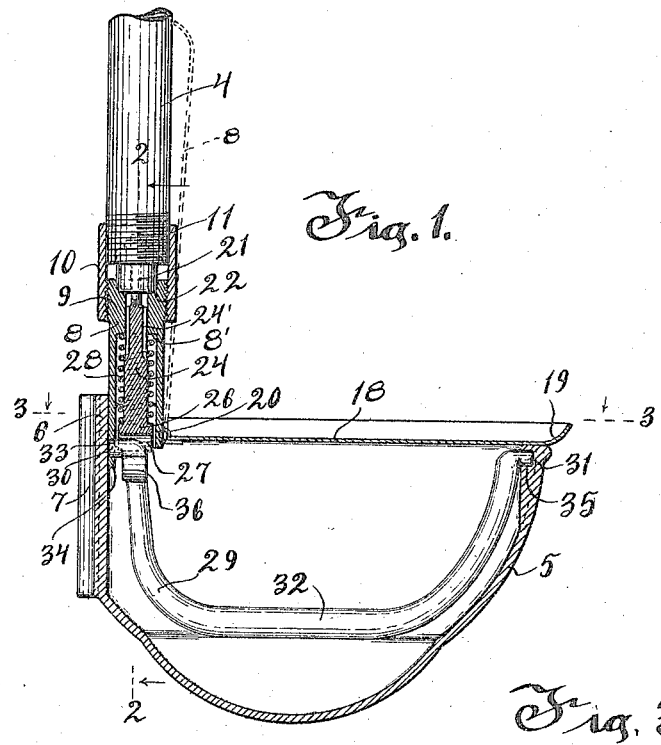
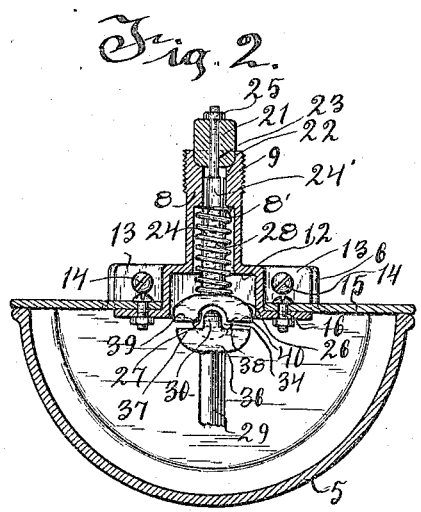
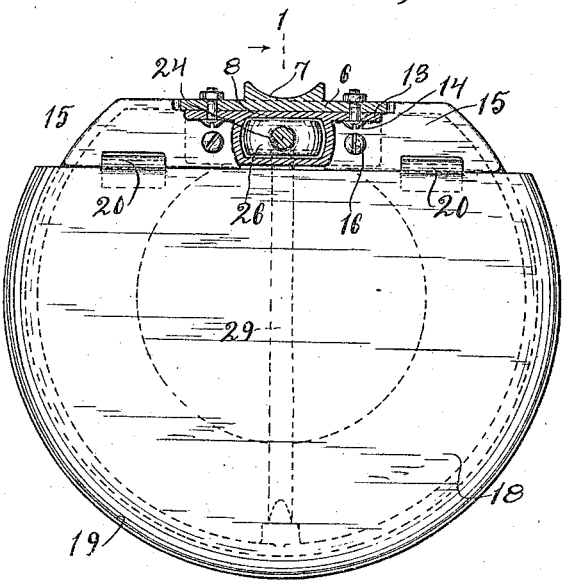
INVENTOR
Robert F. Rasmussen,
By Morsell, Keeney & French,
ATTORNEYS

UNITED STATES PATENT OFFICE.

ROBERT F. RASMUSSEN, OF OSHKOSH, WISCONSIN, ASSIGNOR TO C. A. LIBBEY COMPANY, OF OSHKOSH, WISCONSIN, A CORPORATION OF WISCONSIN.

STOCK-WATERER.

1,184,773.   Specification of Letters Patent.   Patented May 30, 1916.

Application filed December 29, 1915. Serial No. 69,139.

*To all whom it may concern:*

Be it known that I, ROBERT F. RASMUSSEN, a citizen of the United States, and resident of Oshkosh, in the county of Winnebago and State of Wisconsin, have invented new and useful Improvements in Stock-Waterers, of which the following is a description, reference being had to the accompanying drawings, which are a part of this specification.

The invention relates to automatic water bowls for watering stock.

The invention designs more particularly to provide a water bowl which will provide water for animals, particularly horses and cattle, and do this automatically while the animal is drinking, and will automatically shut off the water when the animal stops, or in brief, an automatically operating water bowl whose operation is controlled by the animal.

In its essential elements my automatic water bowl consists of a bowl, a water feed pipe leading thereto, a valve within said pipe and means within said bowl and operated by the animal for controlling the operation of the valve. I am aware that water bowls have been made which contain these elements and that in some of them a plate is disposed in the bottom of the bowl which is in direct engagement with the spring pressed rod for operating the valve. Such a construction is objectionable because the weight of the plate upon the spring gradually weakens it, which eventually results in leakage of the valve. This difficulty I obviate by forming a loose connection hereinafter described between the spring pressed valve rod and the means within the bowl for operating it, so that when the device is in inoperative position there is no connection between the operating means and the valve rod. Furthermore, instead of a plate heretofore used as the valve operating means and which covers the lower portion of the bowl so that the animal cannot exhaust its contents, I provide a swinging lever which permits free access to the bottom of the bowl thus assuring a sanitary construction.

The invention further designs to provide a new and improved form of an automatically operating sanitary water bowl for stock, particularly horses and cattle.

The invention consists in the several features hereinafter set forth and more particularly defined by claims at the conclusion hereof.

In the drawings, Figure 1 is a vertical sectional view of the device embodying the invention; Fig. 2 is a section taken on line 2—2 of Fig. 1; Fig. 3 is a section taken on line 3—3 of Fig. 1.

The device comprises a bowl, a water feed pipe 4, means for connecting said pipe with the bowl, a valve for controlling the flow of water into the bowl, and means for controlling the operation of said valve.

The bowl comprises a receptacle 5 having a flange 6 integral therewith and a curved back extension 7 for attaching it to a post or standard. The means for connecting the feed pipe 4 to the bowl comprises a channel member 8 having a threaded end 9 for threaded engagement with a detachable coupling collar 10 which is removably secured to the threaded end 11 of the pipe 4. This member 8 has an interior shouldered portion 8' intermediate its ends and an interior shouldered portion 12 adjacent its lower end. Flanges 13 integral with the member 8 are secured by screw bolts 14 to the flange 6 of the bowl and plates 15 resting upon the rear portion of the edges of the bowl are secured to flanged portions 17 of the member 8 by screw bolts 16. A cover 18 having an upturned periphery 19 is hinged to the plates 15 by hinges 20. This cover is adapted to swing up into the position shown in dotted lines in Fig. 1, but as the pipe 4 prevents its swinging to vertical position it will fall to closed position unless held open by the animal. This insures the covering of the bowl at all times when the device is not in operation.

The valve comprises a valve head 21, preferably of rubber, adapted to register with a valve seat 22 in the upper end of the member 8, said valve head 21 being adjustably secured by means of a nut 25 to the upper reduced threaded end 23 of a valve rod 24, slidably mounted in the member 8. The valve rod 24 is provided with recesses 24' in its side which permits the water to pass through the channel in the member 8 when the valve is open. The valve rod 24 extends downwardly through the member 8 and is provided with an enlarged head 26 at its lower end which is slidably mounted within the member 8 adjacent the shouldered portion 12 therein and which is provided with a semi-circular transversely extending notch 27 for the purpose hereinafter described. A coiled spring 28 surrounding the valve rod 24 is interposed between the shoulder 8' of the member 8 and the head 26 to normally maintain the valve 21 against its seat 22.

The means for controlling the operation of the valve comprises a lever and means on said lever for operating the valve when the lever is swung to either side of mid-position. This lever consists of a rod 29 curved intermediate its ends 30 and 31 to form a transversely extending portion 32 disposed within the bowl 5 adjacent the bottom thereof. The end 30 of said rod 29 is pivotally mounted in an aperture 33 in a lug 34 on the member 8 and the end 31 is pivotally mounted in an aperture 35 in the bowl 5. Integral with the rod 29 adjacent the end 30 is an enlarged head 36 having flat sides 37 and 38 adapted to contact with the sides 39 and 40 respectively of the head 26 on the valve rod and the end 30 of the rod 29 projects from the head 36 and fits loosely within the notch 27 on the head 26. The result of this construction is that the lever does not act upon the valve rod when the device is inoperative but only engages therewith when either side of the head 26 contacts with the head 36 when the lever is swung from midposition and the rod allows free access to the bottom of the bowl, thus assuring a sanitary construction.

The operation of the device is as follows:—
The animal raises the cover 18 by pushing up upon the curved edge 19 with its nose and then by swinging the lever or rod 29 to either side causes the head 36 to contact with the head 26 of the valve rod thus raising the valve rod 24 against the action of the spring 28 to lift the valve 21 from its seat 22 to allow the water from the feed pipe 4 to pass therefrom through the member 8 and into the bowl. As soon as the animal stops pushing the lever to either side, said lever comes back to midposition and the spring 28 acting against the valve rod 24 closes the valve 21 against its seat 22 and shuts off the supply of water to the bowl. As some water always remains in the lower or bottom portion of the bowl the animal will operate the rod 32 in an endeavor to reach this water. The invention thus exemplifies an automatically operating water bowl in which the means for operating the valve permits free access to the bowl and does not contact with the valve except when the device is in operation.

What I claim as my invention is:—

1. The combination, with a supply pipe, of a water bowl communicating with said pipe, a valve for controlling the passage of water to the bowl, and a stirrup-shaped rod swingingly mounted at its upper ends in the bowl and having its transverse portion spaced from the bottom thereof for operating said valve when swung to either side of mid-position.

2. The combination, with a bowl and a feed pipe communicating therewith, of a valve for controlling the flow of water to the bowl, a rod pivotally mounted in the bowl, and means comprising a loose connection between said valve and said rod to operate said valve when the rod is swung from its mid-position.

3. The combination, with a bowl and a feed pipe communicating therewith, of a valve for controlling the flow of water to the bowl, a rod swingingly mounted within the bowl and movable from mid-position to either side thereof, and means on said rod adapted to operate said valve when the rod is swung to either side of mid-position.

4. The combination, with a bowl, of a channel member secured to said bowl and communicating therewith, a feed pipe connected to said channel member, a spring pressed valve rod slidably mounted in said member, a valve carried by said rod and contacting with the upper end of said channel member to normally shut off the supply of water therefrom, a lever swingingly mounted on the bowl within the same, and means on said lever adapted to contact with said valve rod when the lever is swung to either side of mid-position to open the valve.

5. The combination, with a bowl, of a channel member secured to said bowl and communicating therewith, a spring pressed valve rod slidably mounted in said member, a valve carried by said rod and contacting with the upper end of said channel member to normally shut off the supply of water to the bowl, a head on the lower end of said valve rod, a lever laterally swingingly mounted within the bowl, and a head on said lever adapted to contact with the head on the valve rod to open the valve when the lever is swung to either side of mid-position.

6. The combination, with a bowl, of a feed channel member secured to said bowl, a spring pressed valve rod slidably mounted in said member, a valve carried by said rod and contacting with the upper end of said channel member to normally shut off the supply of water to the bowl, a head on the lower end of said valve rod having a notch therein, a lever pivotally mounted on the bowl and having one end loosely fitting within the notch on said rod, and a head on said lever adapted to contact with the head on the valve rod to open the valve when the lever is swung to either side of mid-position.

In testimony whereof, I affix my signature, in presence of two witnesses.

ROBERT F. RASMUSSEN.

Witnesses:
C. A. LIBBEY,
A. T. HENNIG.

Copies of this patent may be obtained for five cents each, by addressing the "Commissioner of Patents, Washington, D. C."